United States Patent [19]

Sum et al.

[11] Patent Number: 4,958,289
[45] Date of Patent: Sep. 18, 1990

[54] AIRCRAFT PROPELLER SPEED CONTROL

[75] Inventors: Michael J. Sum; George W. Bennett; Steven A. Merrell; Neil Walker, all of Cincinnati, Ohio

[73] Assignee: General Electric Company, Cincinnati, Ohio

[21] Appl. No.: 284,261

[22] Filed: Dec. 14, 1988

[51] Int. Cl.$^5$ ............................................. B64C 11/44
[52] U.S. Cl. .................. 364/431.01; 364/442; 364/424.01; 416/27; 416/30
[58] Field of Search .......... 364/433, 434, 442, 431.01, 364/431.02, 424.01; 416/25–27, 30, 37, 46, 48, 154, 153, 147

[56] References Cited

U.S. PATENT DOCUMENTS

| | | | |
|---|---|---|---|
| 4,533,296 | 8/1985 | Duchesneau et al. | 416/46 |
| 4,588,354 | 5/1986 | Duchesneau et al. | 416/27 |
| 4,639,192 | 1/1987 | Harrell | 416/27 |
| 4,648,797 | 3/1987 | Martin | 416/27 |
| 4,648,798 | 3/1987 | Voisard | 416/48 |
| 4,772,180 | 9/1988 | Walker et al. | 416/33 |
| 4,845,617 | 7/1989 | Kamenetz et al. | 364/424.04 |

OTHER PUBLICATIONS

Casamassa et al., "Jet Aircraft Power Systems", 1957, pp. 235–237.
Casamassa, "Jet Aircraft Power Systems, Principles and Maintenance", 1950, pp. 192–195.
Cohen et al. "Gas Turbine Theory", No date, pp. 363–369.
Sobey et al, "Control of Aircraft and Missile Power–Plants", No Date, pp. 137–141.

Primary Examiner—Thomas G. Black
Attorney, Agent, or Firm—Jerome C. Squillaro

[57] ABSTRACT

The invention concerns a control for an aircraft propeller. During operation in reverse pitch, as occurs upon thrust reversal during a landing maneuver, the speed of the propeller is controlled by adjusting pitch of the propeller, in order to prevent overspeeding. Further, during the transition period while the propeller is converting from forward pitch to reverse pitch, the propeller presents a light load to the engine. At this time, fuel flow to the engine is limited in order to restrict delivery of energy to the propeller, again, for the purpose of preventing overspeeding.

22 Claims, 12 Drawing Sheets

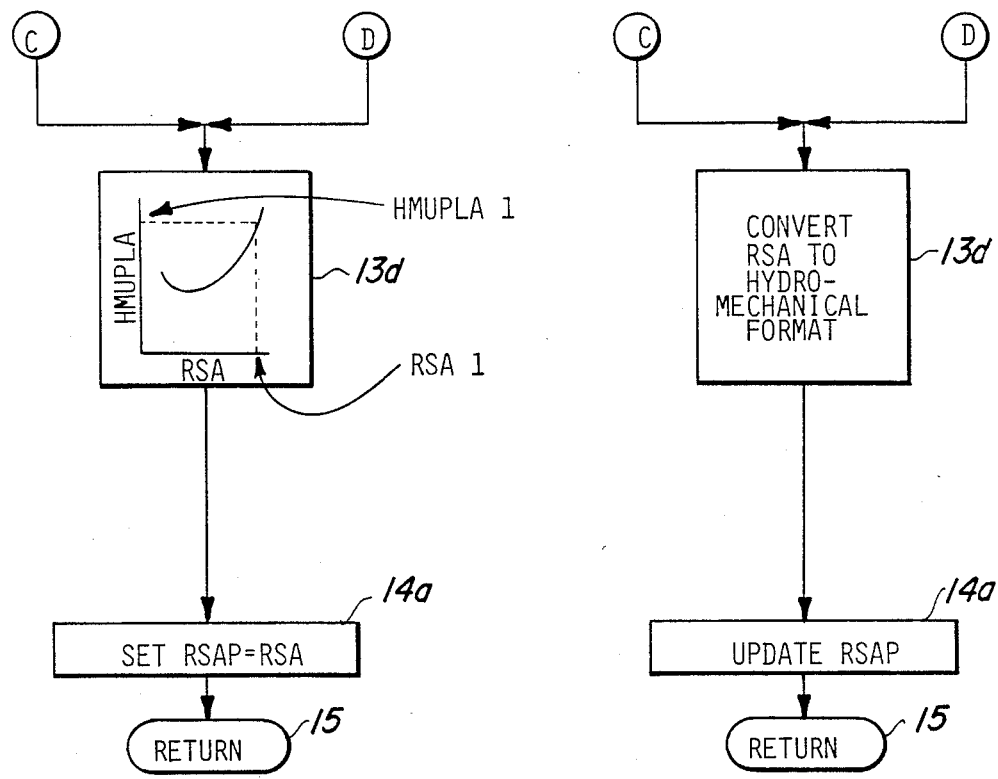
*Fig-10*
*Fig-10A*
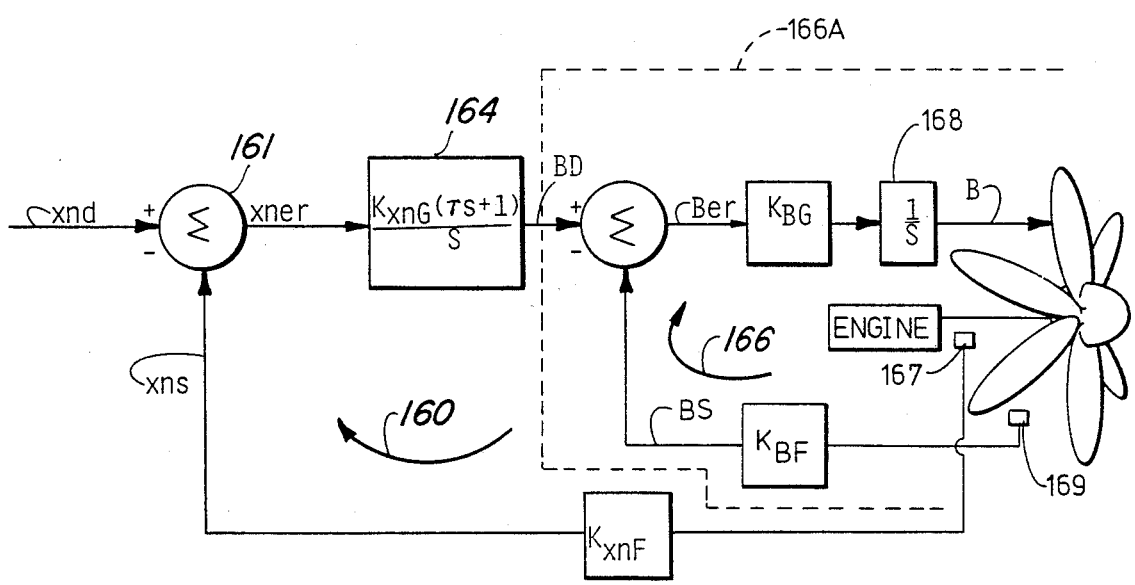
*Fig-11*

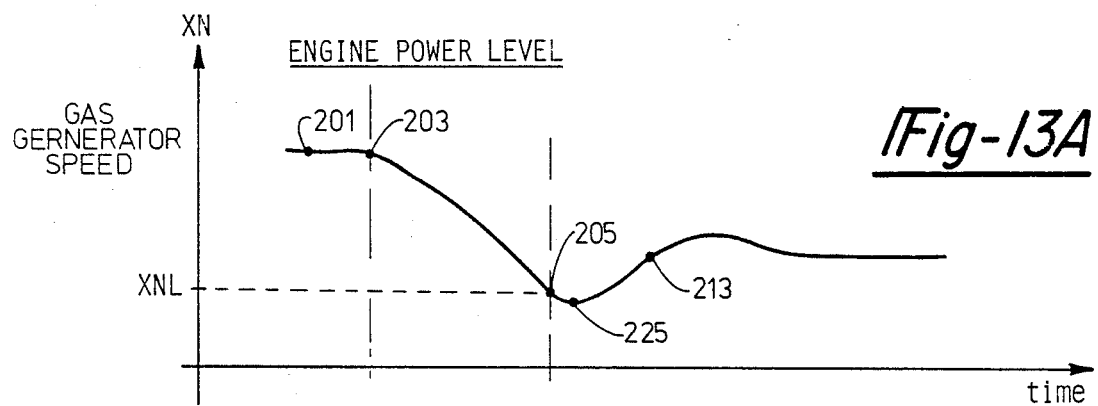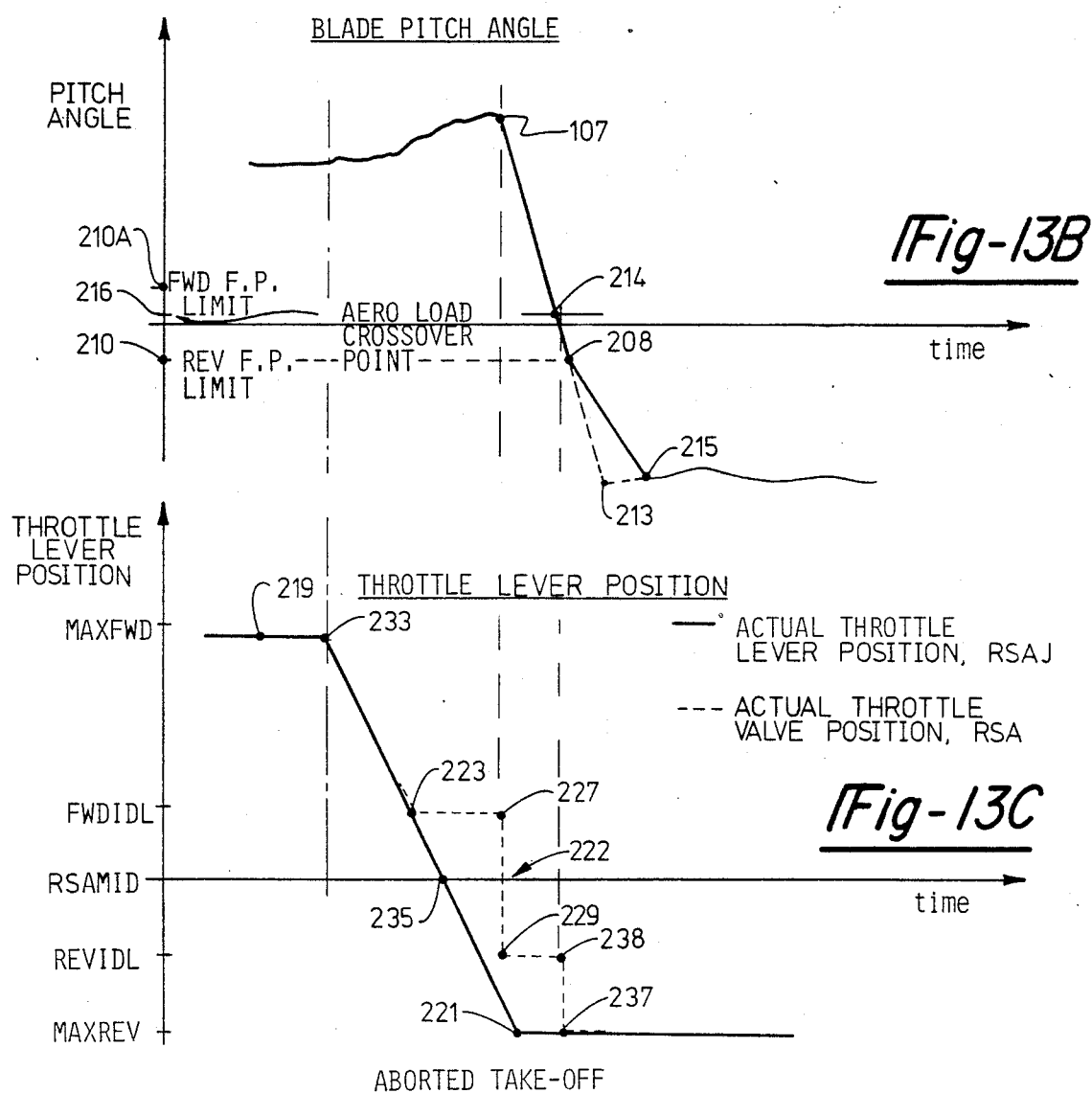

AIRCRAFT PROPELLER SPEED CONTROL

The invention relates to controls for aircraft engines and, more particularly, to a control which functions during thrust reversal of an aircraft propeller system. The propeller system can be of the dual contrarotating type.

BACKGROUND OF THE INVENTION

Many types of propeller-driven aircraft are equipped with systems which can change the pitch of the propeller for reversing thrust. Thrust reversal provides braking power after the aircraft touches down during a landing maneuver. In addition, reverse thrust can be used for motive power on the ground, as in backing the aircraft away from an airport terminal.

Thrust reversal is illustrated in FIGS. 1-3. FIG. 1 shows a typical aircraft propeller 103 having blades 104, and FIG. 2 is a view taken along lines 2-2 in FIG. 1. Pitch is defined as the angle B made between the chord 105 of the propeller blade and circumference 106, also shown in FIG. 1.

Blade 104 in FIG. 2 illustrates a positive pitch angle, used during forward flight. The propeller 103 rotates in a direction shown by arrow 109 in FIGS. 1 and 2 and the incoming airstream 112 in FIG. 2 is driven roughly along path 113, providing forward thrust for the airplane.

For reverse thrust, the blade 104 is rotated to position 104B in FIG. 3, having a negative pitch angle B. The direction of propeller rotation, shown by arrow 109 in FIGS. 1 and 3, stays the same, so that now the incoming airstream 112 is driven along path 114, providing reverse thrust.

Typically, the sequence of events taken by the pilot during thrust reversal is the following: First, the pilot changes the throttle lever position in order to reduce fuel flow to the engine in order to reduce engine speed. Then, the pilot reverses the pitch of the propeller to that as shown in FIG. 3. Following this, the pilot restores the throttle lever to a position of higher fuel flow in order to resume a higher engine speed. At this time, the pilot monitors a tachometer which indicates engine speed in order to assure that neither the speed of the engine nor that of the propeller becomes excessive.

One hazard associated with the thrust reversing procedure just described results from the fact that the load which the propeller presents to the shaft 116 in FIG. 1 is a function of pitch angle B. For example, large pitch angles, in both forward and reverse thrust, require more shaft horsepower to be delivered by shaft 116 in order to maintain a given rotational speed than do small pitch angles: the larger pitch angles cause a larger load. Further, very small pitch angles, at or near zero degrees (termed flat pitch), present such a small load that it is possible that the propeller might achieve an overspeed condition, inflicting damage upon the engine or propeller. The pilot must monitor engine speed in order to guard against overspeeding resulting from flat pitch.

In a different type of propulsion system, namely, one using contrarotating propellers, such as propellers 117 shown in FIG. 6, additional phenomena occur during thrust reversal. One phenomenon can be explained with reference to FIG. 5, which is a schematic cross-sectional view of the propulsion system in FIG. 6. In that figure, a high-energy gas stream 118 provided by a gas generator (not shown) drives turbines 119 and 121 in opposite rotational directions. Blades 117F and 117A are directly connected to turbines 119 and 121, and also rotate in opposite directions. One such propulsion system is that contained in U.S. patent application "Counter-Rotation Power Turbine," Ser. No. 782,466, filed by K.O. Johnson on May 1, 1985, and which is hereby incorporated by reference.

During forward flight, the propellers accelerate incoming air 112 in the aftward direction indicated by arrow 124, thus providing thrust. However, during thrust reversal, the incoming air 112 is reversed in direction as shown by arrow 126, and the situation causes the fore propeller 117F to be more heavily loaded than the aft propeller 117A, thus inclining the aft propeller to spin faster than the fore propeller, for reasons which will now be explained.

The fore propeller 117F can be viewed as extracting air from region 128, located between the propellers, and pushing it into the incoming airstream 112. The fore propeller 117F thus creates a low pressure in region 128 and a high pressure at region 130. Restated, the fore propeller is propeller 117A is driving air indicated by arrow 133 into a lower pressure region, namely into region 128, as compared with region 130 for the fore propeller. The aft propeller 117A is doing less work and so tends to spin faster.

Stated another way, the fore propeller 117F shields the aft propeller from the incoming airstream 112 so that the aft propeller 117A not need fight this incoming air. Accordingly, the aft propeller is loaded less than the fore propeller, and tends to rotate faster.

Therefore, in such contrarotating systems, not only does the possibility of overspeeding as a result of flat pitch arise, but also the differential loading placed upon the propellers can cause the more lightly loaded propeller to attain an overspeed condition.

OBJECT OF THE INVENTION

It is an object of the present invention to provide an improved system for generating reversing thrust in aircraft.

BRIEF DESCRIPTION OF THE DRAWING

FIGS. 7-10 are a flow chart describing computational steps used in one form of the invention.

FIGS. 7A, 8A, 9A, and 10A are a second flow chart describing the computational steps of FIGS. 7-10, but in simpler language.

FIG. 11 is a block diagram of a control system which controls propeller speed by modulating propeller pitch.

FIGS. 13A—13C are respective plots of engine power level, blade pitch angle, and throttle position which occur during an exemplary engine deceleration.

SUMMARY OF THE INVENTION

In one form of the invention, a control senses a request made by an aircraft pilot for engine thrust reversal. In response, the control limits engine speed within a predetermined, safe range, by limiting fuel flow to the engine so that the occurrence of small propeller pitch angles will not cause an overspeed condition.

In another form of the invention, speed is limited by automatically modulating pitch of the propeller.

DETAILED DESCRIPTION OF THE INVENTION

Figure 4:
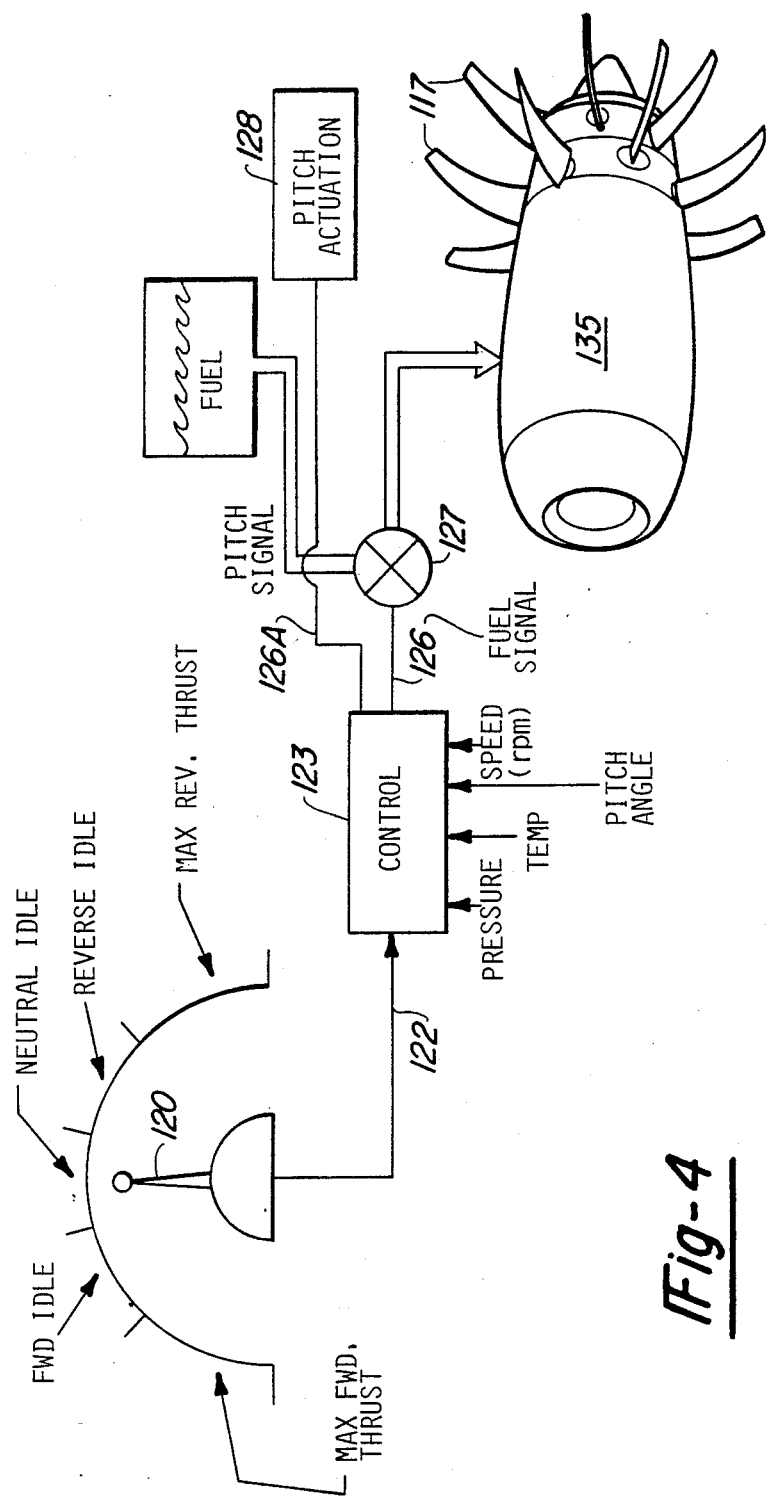
FIG. 4 illustrates a fuel control system for an aircraft engine.

FIG. 4 illustrates a throttle lever 120 under the control of a pilot of an aircraft. The throttle lever provides a signal on line 122 indicative of the type of thrust demanded. Several throttle lever positions can be selected, including those for (1) maximum forward thrust, which is used during takeoff; (2) forward idle, which is used during some flight conditions and at times during taxiing on the ground; (3) neutral idle, at which the propeller is spinning, but providing very low thrust; (4) reverse idle, at which the propeller is spinning at a low speed, but providing reverse thrust; and (5) maximum reverse, used upon landing gin order to slow the aircraft. Intermediate positions between those just mentioned can also be selected.

The signal on line 122 is fed to a control 123, known in the art, which receives other input information about the operating conditions of the engine 135, such as selected pressures, temperatures, propeller pitch angles, and rotational speeds. In response to these inputs, the control 123 computes the proper rate of fuel delivery under the current operating conditions and indicates the proper rate by a fuel signal on line 126. The fuel signal is fed to a fuel metering valve 127 (or "throttle valve"), which delivers the rate of fuel requested by the control 123 to the engine 135. The control 123 also provides a pitch signal which is sent to a pitch actuation system 138, which adjusts the pitch angles of the propeller blades.

Figure 1:
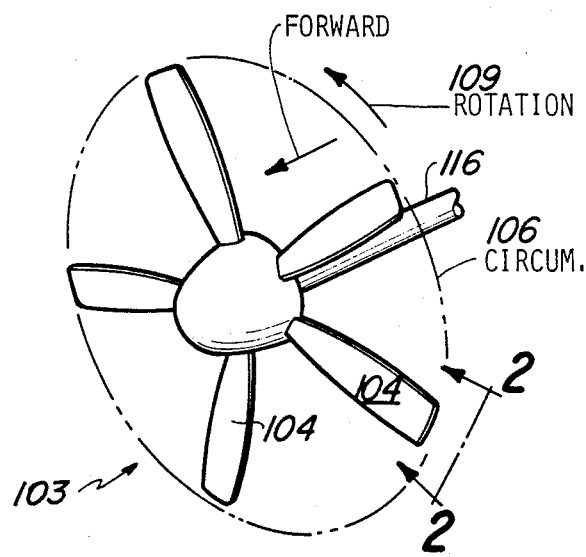
FIG. 1 illustrates an aircraft propeller.
Figure 2:
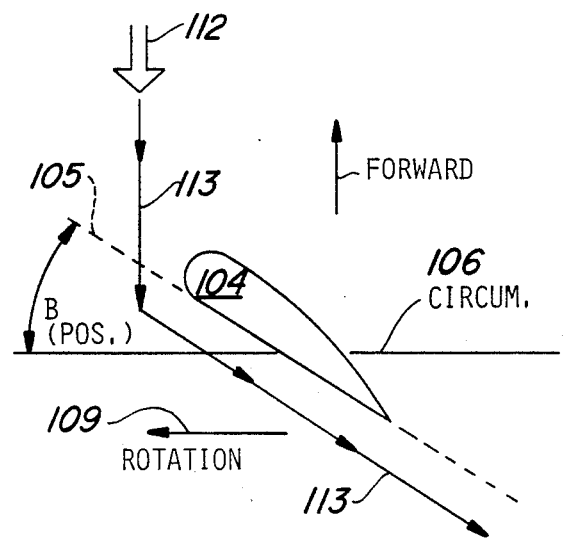
FIGS. 2 and 3 illustrate the generation of forward and reverse thrust by the propeller.
Figure 3:
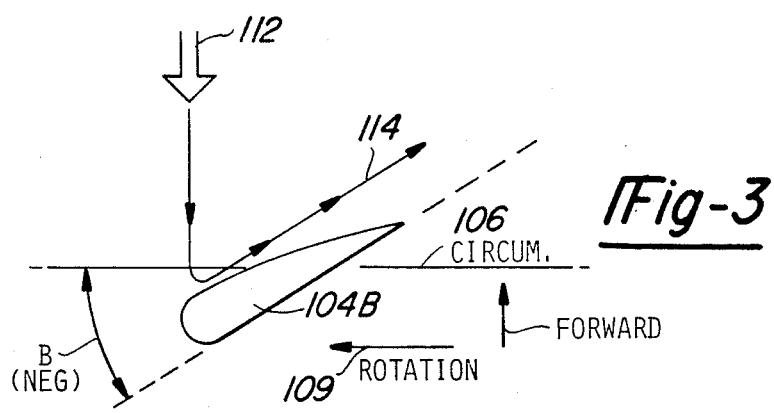

Three aspects of the throttle lever 120 should be noted: (1) the actual rate of fuel delivered by the throttle valve 127 is somewhat decoupled from the rate demanded by the throttle lever 120: "throttle lever" position should not be confused with "throttle valve" position. One reason is that leads and lags are built into the control 123, for reasons which need not be explained here, which decouple throttle lever position from throttle valve position. (2) It should also be noted that there are five positions, and intermediates like those in FIG. 4, definable with respect to throttle valve position. For example, one position delivers fuel for maximum forward thrust. (3) The throttle lever 120 can be viewed as equivalently providing a demanded fuel delivery rate, a demanded throttle valve position, or a demanded thrust. All three phrases have similar meanings. The invention senses a crossing of the neutral idle position by the throttle lever 120, either going toward the forward idle position or going toward the reverse idle position. After such a crossing, it is likely (because of the operation of other equipment discussed later) that the propeller blades 117 change from a positive pitch angle to a negative pitch angle, or the converse, and that, consequently, the propeller blades 104 in FIG. 2 pass through flat pitch, thus presenting a light load to shaft 116 in FIG. 1. At this time, the invention limits fuel flow to the engine, thus limiting both engine speed and propeller rotational speed. In addition, the invention controls propeller speed during reverse thrust operation by modulating pitch.

The following discussion explains the functioning of the invention in more detail.

FIGS. 7-10, when viewed together, provide a flow chart which illustrates the functioning of the invention. The abbreviations used in the flow chart are explained in the following Table 1.

TABLE 1

Pitch Angle (Beta)—Angle between chord line of blade and circumference.

Fine Pitch (flat pitch)—A range of blade pitch angles which are associated with small blade loading levels. A blade in fine pitch produces nearly zero thrust.

RPM—Rotational speed (rev/min).

Blade loading—Refers to aerodynamic load on the blade or the ability of the blade to do work on the air stream.

RSA—Designates position of aircraft throttle valve 127 in FIG. 4.

RSAJ—Actual position of aircraft throttle lever 120 in FIG. 4. RSAJ is referred to in the art as demanded throttle valve position, because it indicates the position to which the throttle valve 127 is desired to be moved.

RSAP—Previous value of RSA.

FWDIDL—Designates position of throttle lever 120 which demands idle thrust power in the forward direction.

REVIDL—Designates position of throttle lever 120 which demands idle thrust power in the reverse direction.

RSAMID—Designates a neutral position of throttle lever 120, demanding idle power, and which defines a transition point between forward and reverse demanded thrust. If RSA>RSAMID then forward idle thrust is demanded. If RSA <RSAMID then reverse idle thrust is demanded.

XN—Engine speed.

XNL—Engine speed limit.

SWXRSA—Transition indicator flag
 SWXRSA
  =1.0, Transition is forward to reverse;
  =0.0, Non-transition;
  =−1.0, Transition is reverse to forward.

XND—Demanded propeller rotational speed

XNS—Sensed propeller rotational speed

XNER—True propeller rotational speed error:(XNER=XND−XNS)

FIGS. 7-10 describe the operation of some of the software and electronic circuitry contained in the control 123 in FIG. 4. Circle 25 in FIG. 7 indicates that both the position of the throttle lever (RSAJ) and the previous (e.g., that occurring 0.012 seconds ago) position of the throttle lever (RSAP) are available as data to the invention. For example, one way to obtain the position of the throttle lever 120 is to read the signal on line 122 in FIG. 4. Further, throttle valve position (RSA) can be read from the throttle valve 127 itself. In addition, a companion set of FIGS. 7A-10A describe in simpler terms the operation of FIGS. 7-10, and should be examined as the corresponding figures in FIGS. 7-10 are described. However, it should be noted that the companion FIGS. 7A–10A are written in simple English for ease of understanding, and may not exactly describe the mathematical expressions in FIGS. 7–10.

ASCERTAINING ONSET OF THRUST TRANSITION

Figure 7:
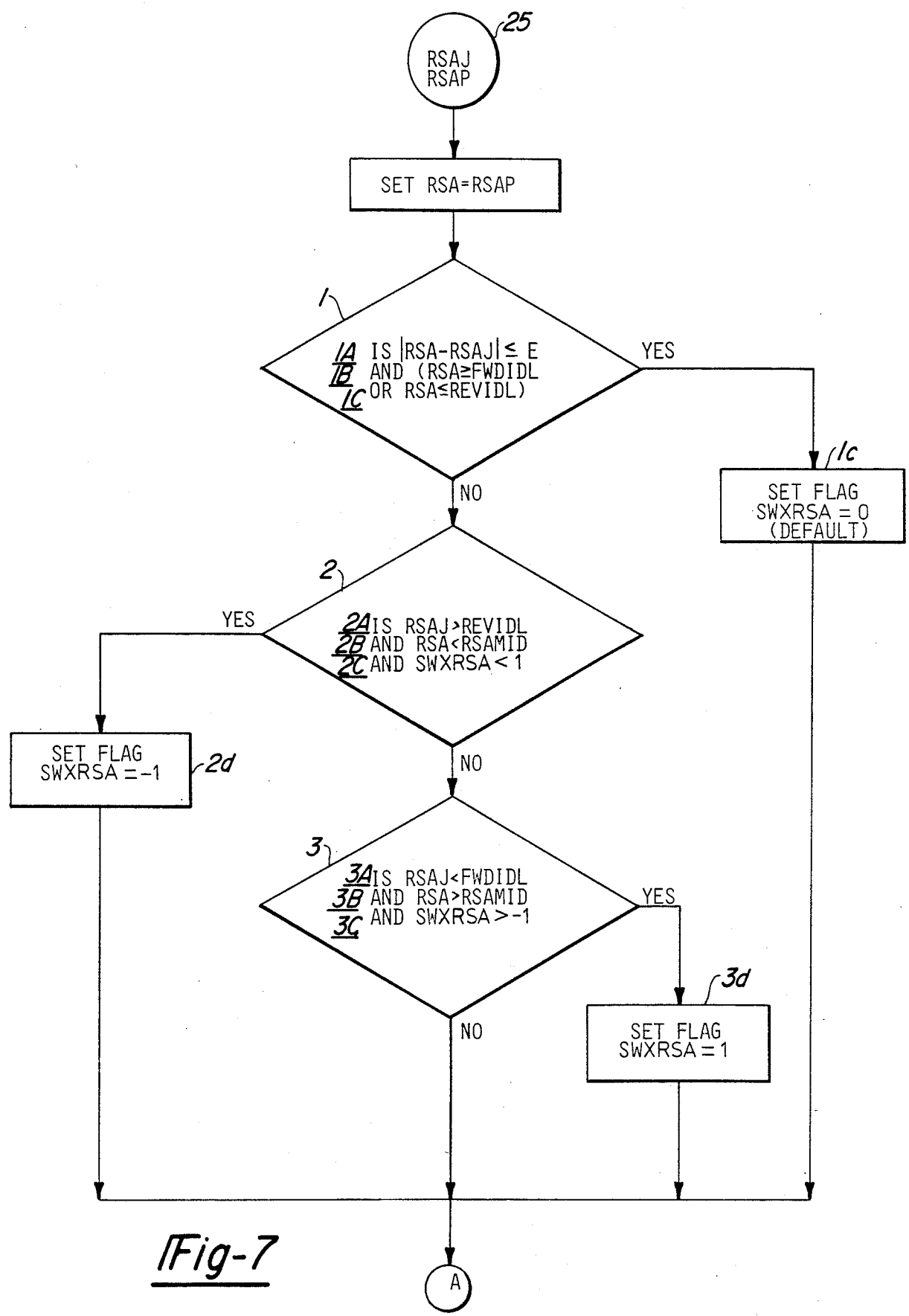

The procedures of FIG. 7 inquire whether a transition in thrust (e.g., reverse-to-forward) is imminent and, in response, sets a flag, SWXRSA, so indicating. Balloon 1 in FIG. 7 inquires whether actual throttle valve position is within a predetermined range of demanded throttle (ie, throttle lever) position, and whether the actual throttle valve position is at a non-idle position. That is, line 1A compares the absolute value of the difference between actual throttle valve position (RSA) and demanded throttle (ie, throttle lever) position (RSAJ). The absolute value of the difference is compared with a bounding value, E. Thus, line 1A inquires whether actual throttle valve position is within a range E of demanded position. Lines IB and IC compare actual throttle valve position (RSA) with both the forward idle position (FWDIDL) and the reverse idle position (REVIDL), also indicated in FIG. 4.

If the results of all inquiries in balloon 1 are yes, meaning that the requested throttle valve position is in fact being supplied, at least within the bound E, and that the throttle valve is not at idle, meaning that the aircraft is being operated during takeoff, flight, or reverse thrust, then block 1c sets a transition flag (SWXRSA) to 0. One meaning of this 0 value is that no transition from forward to reverse thrust is about to occur, and therefore, that no overspeed resulting from flat pitch is imminent. The transition flag (SWXRSA) functions to detain throttle valve position (RSA) at an idle position until engine speed falls below a safe limit, as later discussed in connection with FIG. 9.

A negative result of the inquiry at balloon 1 means that either engine speed (inferred from throttle valve position, RSA) is at idle, or that speed is changing. The latter would be the case when line 1a in balloon 1 indicated that actual throttle valve position (RSA) deviated from the demanded position (RSAJ) by more than the bounding limit E. Consequently, one reaches balloon 2. At this point, a definition should be introduced. The power lever positions shown in FIG. 4 can be viewed as positions along an algebraic number line, with 0 being at the neutral idle position. With this definition, a throttle lever at reverse idle is considered to be "less than" the neutral idle position, just as the number −1 is less than the number 0. Similarly, forward idle is considered to be "greater than" the neutral idle position. Further, the maximum reverse thrust position is considered to be less than the reverse idle position, and so on.

As to balloon 2, inquiry is made on line 2a whether demanded throttle (ie, throttle lever) position (RSAJ) is "greater than" the reverse idle position (REVIDL). In line 2b inquiry is made whether actual throttle valve position (RSA) is less than the neutral idle position (RSAMID). Line 2c inquires whether the transition flag (SWXRSA) is less than 1. That is, line 2b inquires whether the actual throttle valve position is in reverse, either at idle or maximum. Line 2a inquires whether the demanded throttle (ie, throttle lever) position is greater than the reverse idle position. If the answers to all three inquiries of balloon 2 are yes, then block 2d sets the transition flag (SWXRSA) to −1. This value of the transition flag, −1, indicates that a change in demanded thrust has occurred, and, further, that the thrust demand has changed from a demand for reverse thrust to a demand for forward thrust, as indicated in the SWXRSA entry in Table 1. This transition indication can be explained as follows.

The answer to line 2b indicated that actual throttle valve position was in the reverse thrust region. However, the answer to line 2a, taken with the answer to line 2b, indicates that demanded thrust is different than the actual thrust, and that demanded thrust is above reverse idle and perhaps in the neutral or forward region. Further, the answer to line 2c indicates that there has been no recent demand for a thrust transition in the direction of forward to reverse. Therefore, the three affirmative answers obtained to the three inquiries in balloon 2 indicate a strong probability that a thrust transition from reverse to forward has been demanded, and so block 2d sets the transition flag accordingly.

If the results of the inquiries of balloon 2 are negative, one likely cause of the negative result is that there has been a recent demand for thrust transition in the forward-to-reverse direction (that is, SWXRSA=1), or that reverse thrust is being demanded (that is, the answer to line 2a is negative). Accordingly, the decision moves to balloon 3.

Balloon 3 is, in a sense, making the opposite inquiry of balloon 2, namely, whether a recent transition in demanded thrust has occurred in the forward-to-reverse direction. In detail, this inquiry is made on lines 3a–c. Line 3a inquires as to whether demanded thrust (RSAJ) is less than forward idle thrust (FWDIDL). If the answer is yes, demanded thrust is either at neutral idle or in the reverse region.

Line 3b inquires whether actual throttle valve position (RSA) is greater than the neutral idle position (RSAMID). If yes, one infers that forward thrust is being provided.

Line 3c inquires whether a recent thrust transition in the direction of reverse-to-forward has occurred. If the answer to line 3c is yes, then, because of the phrasing of the inquiry, no such recent transition has occurred. (A SWXRSA value of −1 indicates a recent demand change of reverse-to-forward. A "yes" answer means that the value exceeds −1, and thus does not equal −1. Similar considerations apply to the inquiry of line 2c.)

Three affirmative answers to the three inquiries in balloon 3 lead the decision path to block 3d wherein the transition flag (SWXRSA) is set to +1, meaning that a recent transition in demanded thrust has occurred, and the transition was in the direction of forward-to-reverse. Restated, the throttle lever is in a forward position, but reverse thrust is now demanded.

If one of the three inquiries in balloon 3 is negative, a likely reason is that either a recent transition in demand has occurred in the reverse-to-forward direction (that is, SWXRSA in line 3c is in fact equal to −1) or that line 3a indicated that forward thrust is demanded. Such a negative decision leads to balloon 4. At this point, all paths, be they from blocks 1c, 2d, 3d, or balloon 3, lead to balloon 4 in FIG. 8. Further, the transition flag (SWXRSA) now has a value indicating whether a transition is imminent and, if so, the type of transition expected.

DECIDING WHETHER DETENT MAY BE REQUIRED

Figure 8:
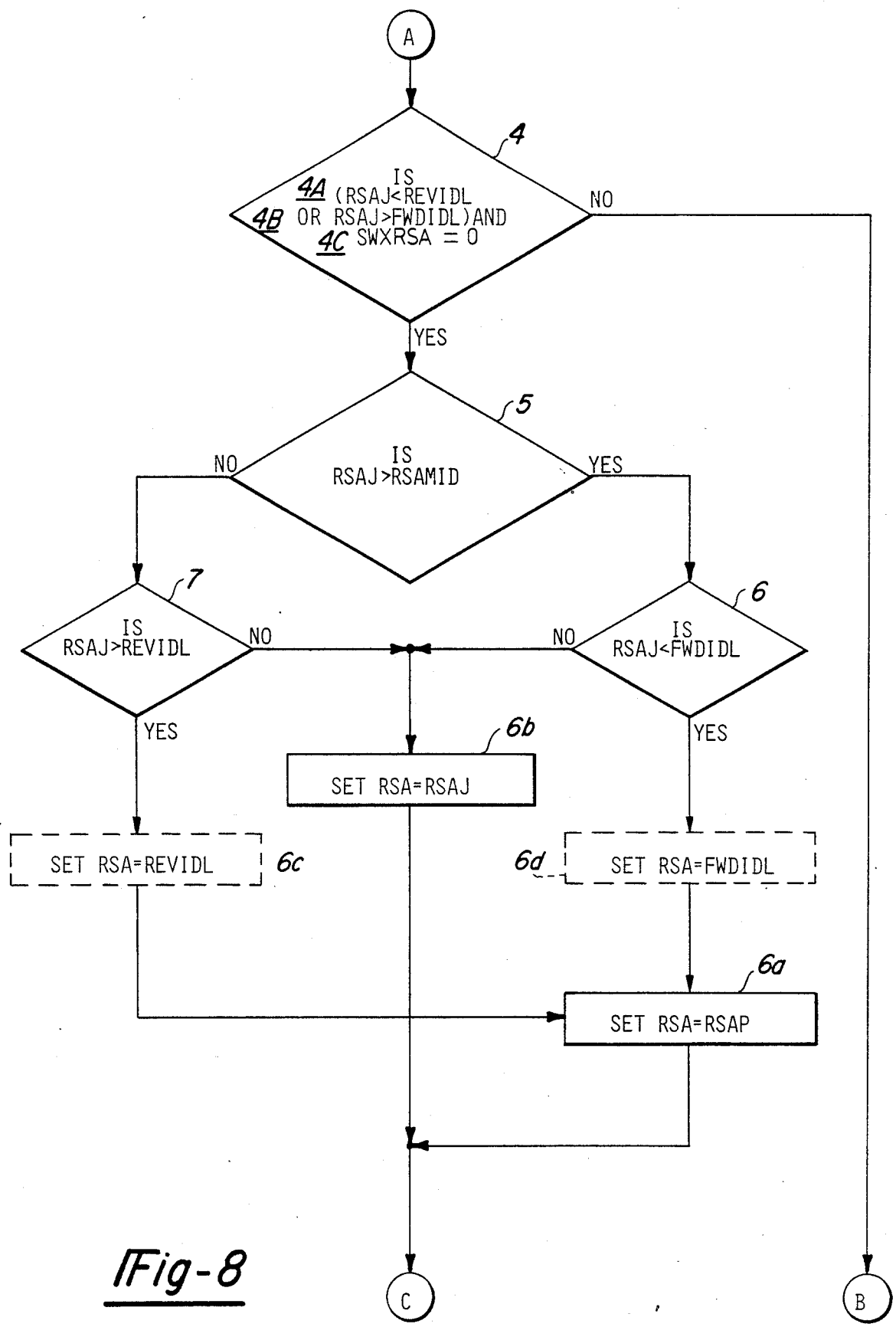

The procedure in FIG. 8 ascertains whether the throttle valve should be set as demanded, or limited, as by a detent. Balloon 4 determines whether or not to activate a throttle detent. By "throttle detent" is meant a system (discussed below) which detains throttle valve position at either forward idle (FWDIDL) or reverse idle (REVIDL), as appropriate, until the engine speed (i.e., engine power) falls below a preset limit, XNL. Then, when the engine speed falls below the limit, (with one exception, discussed later), the detention of the throttle valve is terminated, as discussed below. (Engine speed, XN, refers to the speed of the gas generator, which provides the gas stream 118 in FIG. 5. Engine speed should not be confused with speed of propellers 117.)

Returning to the discussion of balloon 4, lines 4a and b inquire whether demanded throttle (ie, throttle lever) is outside the idle range, either in forward thrust or reverse thrust. In a sense, lines 4a and b inquire whether either high-forward or high-reverse thrust is being demanded.

Line 4c inquires whether the transition flag (SWXRSA) is off. If off (ie, equal to zero), no recent transition in demanded thrust has occurred.

If the answers to both of the inquiries in balloon 4 are affirmative, the decision path reaches balloon 5. At this point, the thrust detent is inactive, because thrust detention occurs in FIG. 9 on the paths between circles B and D, and these paths have not yet been reached. As thrust detent is inactive, the logic associated with balloon 5 acts as follows. (If the detent were active, SWXRSA would not equal zero, and thus balloon 5 would not be reached.)

Balloon 5 inquires whether demanded thrust (RSAJ) exceeds neutral idle thrust (RSAMID). If yes, indicating that a forward thrust is demanded, the decision path leads to balloon 6.

Balloon 6 makes inquiry as to the magnitude of the forward thrust demanded, whether greater or less than forward idle thrust (FWDIDL). If neutral idle or a reverse thrust is demanded, the decision path reaches block 6a, at which throttle valve position (RSA) is set to the last prior throttle lever position measured (RSAP).

If, at balloon 6, demanded thrust (RSAJ) is greater than forward thrust (FWDIDL), indicating that a large forward thrust is demanded, the decision path leads to block 6b wherein throttle valve position (RSA) is set at demanded throttle lever position (RSAJ).

If the inquiry of balloon 5 indicates that demanded thrust (RSAJ) was not greater than neutral idle thrust (RSAMID), indicating that either a reverse thrust or neutral idle thrust was demanded, the decision path leads to balloon 7.

Balloon 7, similar to balloon 6, inquires as to the magnitude of the reverse thrust. If demanded thrust (RSAJ) is greater than reverse idle (REVIDL), indicating that a neutral idle thrust or forward thrust is demanded, the decision path leads to block 6a, and block 6a sets actual throttle valve position (RSA) to RSAP as discussed above.

If balloon 7 indicates that demanded thrust (RSAJ) is not greater than reverse idle thrust (REVIDL), indicating that a large reverse thrust is demanded, then the decision path leads to block 6b, wherein actual throttle valve position (RSA) is set to the demanded throttle lever position (RSAJ).

As determined by balloon 4, the decision paths between balloon 5 and circle c, at the bottom of FIG. 8, are only reached if (1) the thrust transition flag (SWXRSA) is off, that is, at 0, and (2) lines 4a and b (in balloon 4) indicate that a large thrust, either forward or reverse, is being demanded.

Further, balloons 6 and 7 have the following effect: if throttle valve demand (RSAJ) is outside idle, either in forward or reverse, then block 6b sets throttle valve (RSA) as demanded. However, if throttle lever is between the forward idle and reverse idle positions in FIG. 4, block 6a sets throttle valve (RSA) at the last previous value, RSAP. Because of the structure of the computer coding used, RSAP will in fact, at this point, be equal to either REVIDL or FWDIDL. Therefore, block 6a can be replaced by phantom blocks 6B and 6C.

Figure 12:
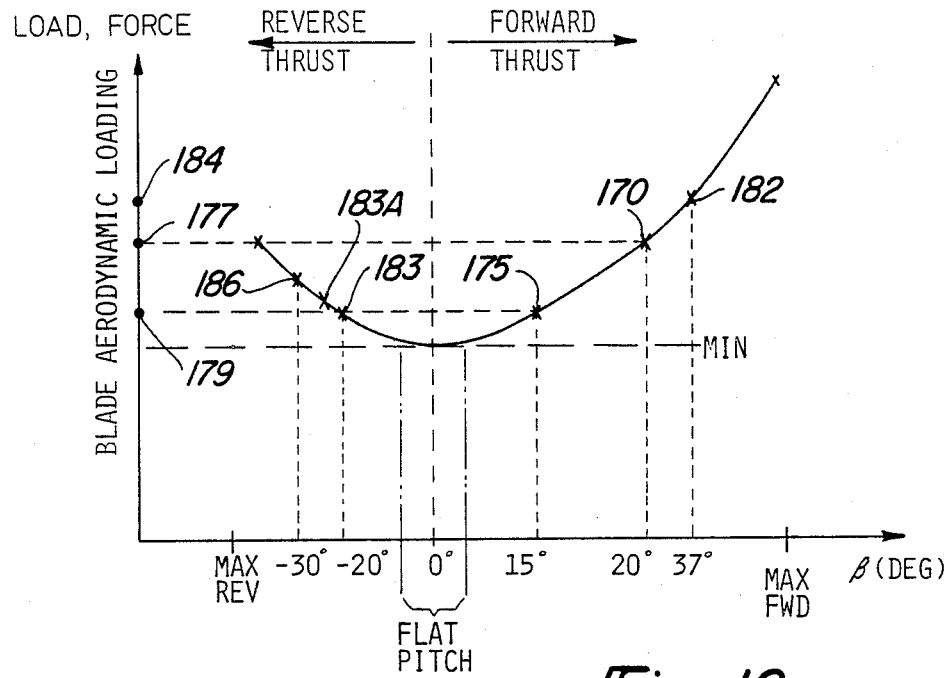
FIG. 12 is a plot of propeller blade aerodynamic loading versus blade pitch angle.
Figure 12A:
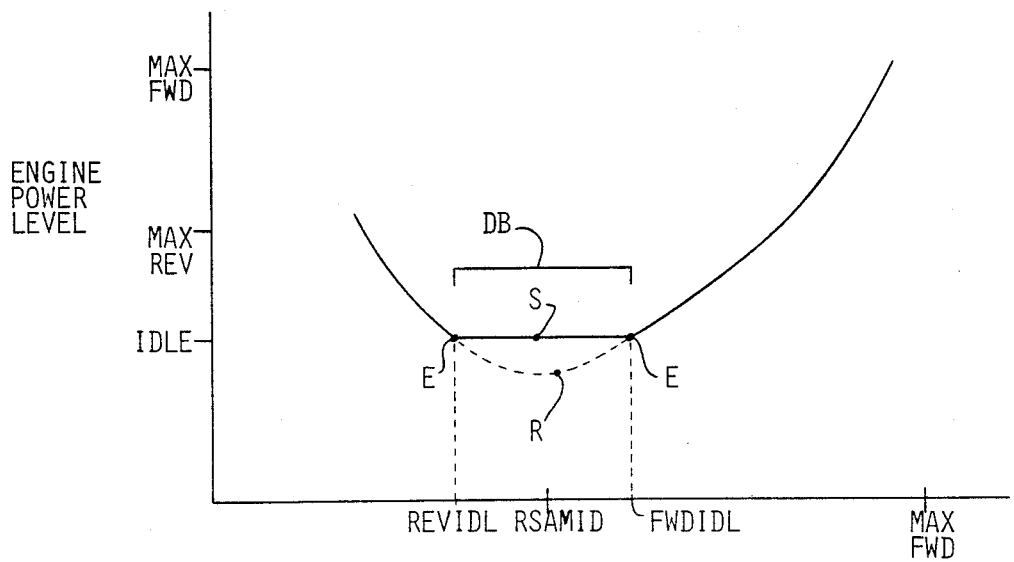
FIG. 12A is a plot of engine power level versus throttle lever position.

Explained another way, block 6a flattens out the engine power-throttle lever position curve in FIG. 12A. Block 6a in FIG. 8 chops off dashed region R in FIG. 12A and replaces it with solid, straight region S. Accordingly, a change in demanded throttle position, RSAJ, as from RSAMID to FWDIDL causes no change in engine power level to occur: power level remains constant on line S. FIG. 12A can be considered as illustrating a type of hysteresis, in the sense that engine power does not change until points E are reached. That is, a deadband DB is created.

THROTTLE DETENT

Figure 9:
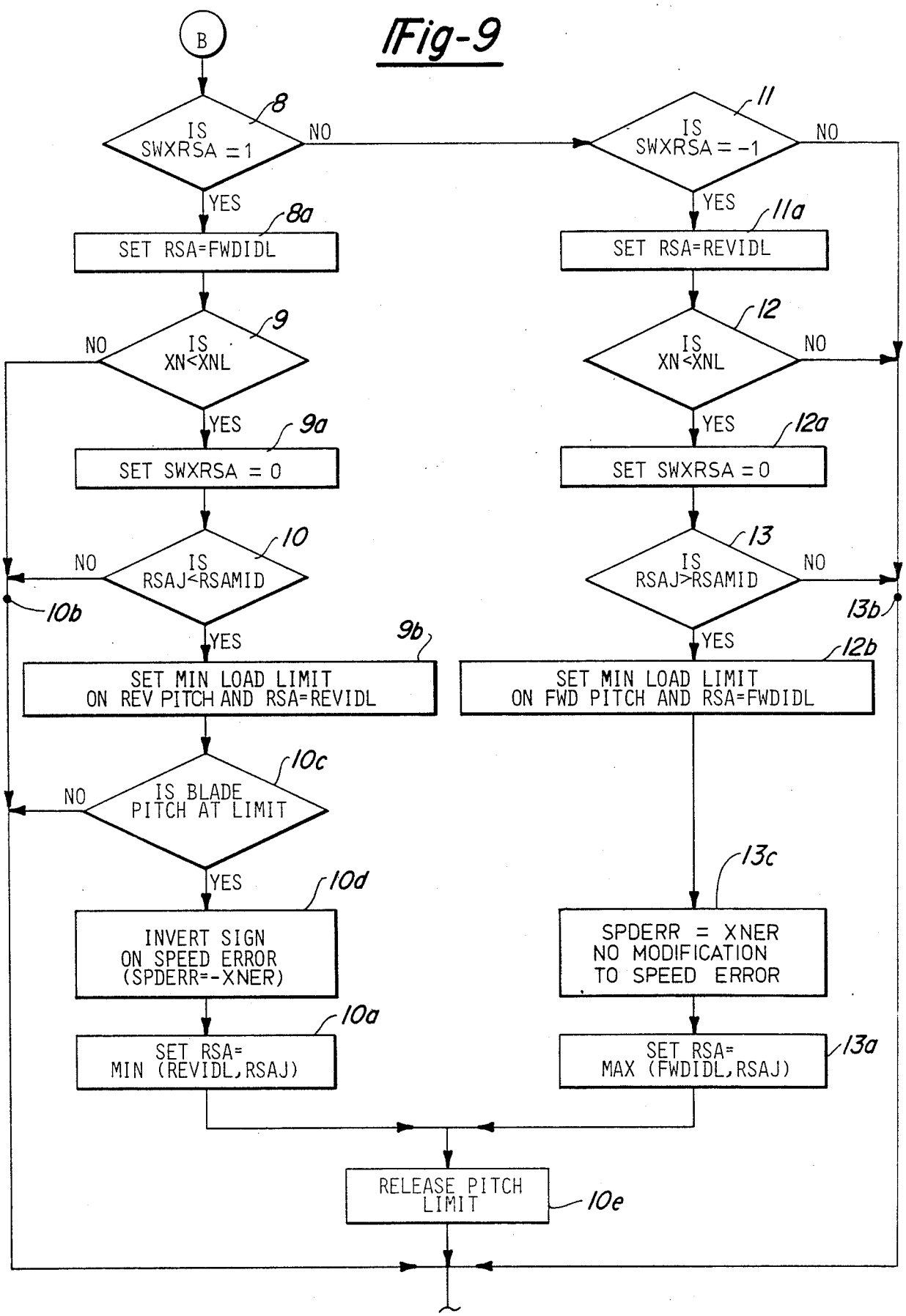

If demanded thrust is in the idle region, either forward or reverse, and the thrust transition flag (SWXRSA) is set either at +1 or −1, then the decision path leads to circle b. Circle b is also shown in FIG. 9, above balloon 8. FIG. 9 describes the throttle detent, pitch limits, and inversion of speed error signal, as will now be discussed. Balloon 8 leads the logic path to block 8a if the transition flag (SWXRSA) is set to +1, indicating that a demanded transition has recently occurred in the forward-to-reverse direction. This block 8a sets actual throttle lever position (RSA) at forward idle (FWDIDL). The throttle valve will remain at forward idle unless balloons 9 and 10a determine otherwise.

Throttle position (RSA) is detained at forward idle by block 8a until (1) engine speed falls below a limit (XNL), (2) throttle valve demand (RSAJ) actually reaches a demand for reverse thrust and (3) blade pitch reaches a predetermined value in reverse pitch. Several reasons exist for this detention. First, until engine speed falls below the limit, a propeller overspeed can occur while the propeller makes an excursion through fine pitch: a high engine speed causes a large energy gas stream 118 in FIG. 5 to enter the turbines 119 and 120, while, at the same time, a finely pitched propeller 117 provides only light loading. The propeller can accelerate.

Figure 5:
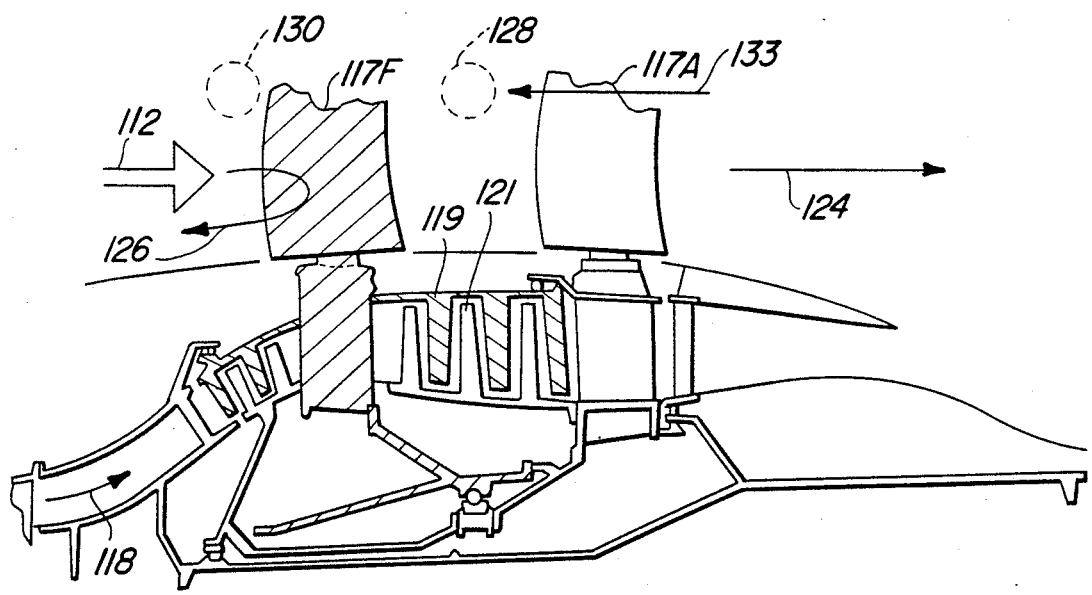
FIG. 5 illustrates in schematic cross section a counterrotating pair of turbines which directly drive a pair of counterrotating propellers.
Figure 6:
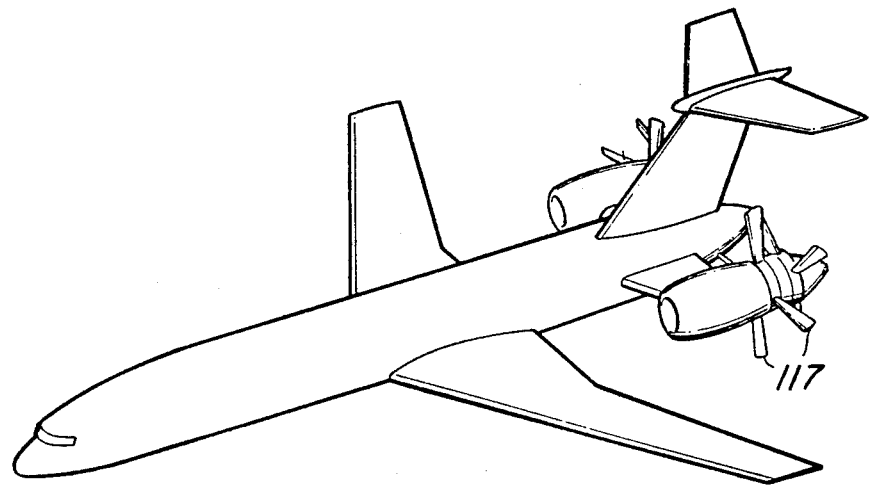
FIG. 6 illustrates an aircraft powered by the counterrotating propellers of FIG. 5.

It should be noted that merely setting throttle valve (RSA) at forward idle in Block 8a does not immediately reduce the energy in the gas stream 118 in FIG. 5. The inertia of the rotating components in the gas generator, together, to a lesser extent, with the residual heat remaining in hot engine parts, causes airstream 118 to deliver significant energy to the turbine until engine speed (XN) falls below the limit (XNL). At this time, the energy in the airstream 118 is considered sufficiently low that an overspeed will not occur.

A second reason for throttle detention is to prevent the mere initiation of a demand for thrust reversal to be, of itself, sufficient to actually cause the reversal. Balloon 10 prevents this, by requiring that throttle valve demand (RSAJ) actually pass neutral idle and indicate a demand for thrust reversal. Balloon 10 thus introduces a type of hysteresis, similar to that discussed in connection with FIG. 12A. Throttle valve (RSA) remains at the forward idle position set by block 8a until throttle valve demand (RSAJ) passes neutral idle (RSAMID). Then, block 10a sets throttle valve (RSA) at the lesser of reverse idle (REVIDL) or demanded throttle (RSAJ). As in FIG. 12a, an engine power level corresponding to dashed line R is unattainable: only the levels on solid line S can be reached.

A third reason for throttle detention is to prevent delivery of engine power (eg, in the form of gas stream 118 in FIG. 4) to the propellers until they have reached a pitch position in reverse pitch which imposes a sufficient load that overspeed is prevented. Such a pitch position, in the preferred embodiment, is negative 5 degrees, and represents the lowest propeller loading allowable while reverse thrust is being applied, as indicated in block 9a. Balloons 9, 10 and 10c, discussed in the three reasons just given, will now be described in more detail.

As stated above, throttle detention is terminated in block 10a. However, in order to reach block 10a, the YES path from all of the balloons 9, 10 and 10c must be taken. In balloon 9, the YES path indicates that engine speed (XN) is sufficiently low (below XNL) that propeller overspeed is not a concern. Then, block 9a sets the transition flag (SWXRSA) to 0 because the imminent forward-to-reverse transient is considered to have disappeared. That is, the transient is no longer imminent: it is now in progress. The need for a transition flag has disappeared. Stated another way, the transition flag (SWXRSA) functions chiefly to bring the logic path to block 8a (or 11a). Once this has been done, there is no further need for the transition flag.

Block 9b sets the reverse pitch limit described above. This limit has three significant features. First, at negative five degrees, as stated, the propeller presents a light, though significant, load, thus reducing concerns about overspeeding. Second, while this limit persists, propeller pitch can attain any value below the limit such as negative 10 degrees, but may not exceed the limit by attaining a value such as negative 3 degrees. Third, while setting the limit, the loop in the control which controls speed by changing pitch is opened up. That is, irrespective of the pitch which is demanded by the control 123 in FIG. 4, block 9a causes the pitch demand signal to demand a pitch of negative 5 degrees, which is the limit value.

Balloon 10c inquires whether the pitch has reached the limit. If so, throttle valve position is allowed to equal demanded throttle (ie, equal throttle lever position) in block 10a, as discussed above. That is, the detention is terminated.

Block 10d, which refers to an inversion of the sign on speed error, will now be discussed. This discussion will be divided into three parts. (1) A description of a propeller control which governs speed by changing pitch, (2) an explanation of the failure of the control to operate in reverse thrust, and (3) an explanation of a corrective procedure will be given.

PROPELLER SPEED CONTROL

FIG. 11 illustrates a control for controlling the speed of propeller 103 by controlling the pitch of the propeller blades. The control includes two control loops. A first loop 160 measures propeller speed and subtracts the speed, XNS, from demanded propeller speed, XND (supplied by the pilot) in summer 161, producing a speed error signal, XNER. A speed control dynamics block 164 converts the speed error XNER to a demanded pitch BD. One reason for the need of block 164 is that the units of speed error, XNER, are in rpm, while the units of demanded pitch, BD, are in degrees. Block 164 converts rpm to degrees. Block 164 also contains appropriate dynamics (ie, equations and computer code) for achieving stable speed control.

The second loop 166 subtracts measured pitch, BS, from demanded pitch, BD, in order to develop a pitch error signal, BER. Integrator 168 provides the actual pitch B, based on pitch error BER. Integrator 168 is actually a hydraulic piston, or other device having an output (e.g., piston displacement) which is a time integral of the input signal (e.g., fluid pressure. For example, application of a 100 psi pressure for two seconds results in a four inch displacement. The same pressure applied for four seconds results in an eight inch displacement, and so on.

An example will illustrate the operation of the control. Assume that present speed is 800 rpm, but that demanded speed is 900 rpm. An error signal of +100 rpm is produced by summer 161. Block 164 converts this 100 rpm speed error into a demand for a pitch which may be 15 degrees, which is input o summer 165. Actual pitch may be 20 degrees, resulting in a pitch error signal, BER, of −5 degrees. The negative pitch error signal indicates that pitch must be reduced. In reducing pitch, the load upon the propeller is reduced, allowing the propeller to accelerate and eliminate the speed error signal, XNER. In FIG. 12, the change in pitch can be viewed as a jump from point 170 to point 175: the blades shift from a higher loading point (170) to a lower loading point (175).

FAILURE TO OPERATE IN REVERSE THRUST

The operation of the control shown in FIG. 11 during forward thrust has been described. It will now be shown that such a control will not function properly in reverse thrust.

As FIG. 12 shows, the slope of the loading-pitch curve changes as it crosses zero pitch. Consequently, if one were to simply change pitch to reverse, as by setting pitch at point 183, and then demand a propeller speed by applying a signal XND, the control of FIG. 11 would not provide the proper speed, as will now be explained.

Assume, similar to the last example, that propeller speed is 800 rpm, but demanded speed XND in FIG. 11, is 900 rpm. Thus, an error signal of +100 rpm exists. If pitch angle is at −20 degrees (not +20 degrees as in the example above), then the control functions as described in the example above: the control reduces pitch by five degrees, and drives pitch to −25 degrees. However, as FIG. 12 indicates, such a pitch has a higher loading, as indicated by point 183A, as compared with point 183. The propeller will decelerate, instead of accelerating as requested.

CORRECTIVE PROCEDURE

The inventors' solution to this problem is shown in FIG. 9, wherein block10d inverts the algebraic sign on speed error when pitch goes into reverse (specifically, when the blades reach the aero load crossover point 216 in FIG. 13, which is described in greater detail in Example 6, below.) This inversion multiplies XNER, the speed error signal in FIG. 11, by negative one.

Several significant features of this inversion will now be discussed.

Figure 11A:
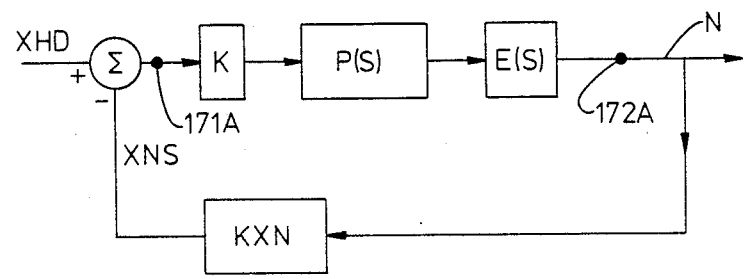
FIG. 11A is a block diagram showing FIG. 11 in simplified form.

(1) The control of FIG. 11 can be redrawn as shown in FIG. 11A, wherein block P(s) replaces the pitch control system and block E(s) represents the engine driving the propeller. In the present invention, E(s) represents the gas generator providing the gas stream 118 in FIG. 5. A gain block K is also provided.

In a control systems sense, the gain block K and the engine block E(s) have a similar mathematical property: each is contained in the expression [K][P(s)][E(s)], which is the transfer function between point 171A and point 172A. Consequently, the algebraic sign of each affects the sign of the expression.

During reverse pitch, as shown in the example just given, the engine behaves opposite to the way it behaves when in forward pitch. In the example, in forward thrust, a demand for increased speed was met with an decrease in propeller pitch, causing a decrease in loading, causing an increase in speed. However, in reverse thrust, a demand for increased speed was met with a decrease in pitch and a decrease in speed.

Therefore, in a mathematical sense, the block E(s) acquires a negative sign when pitch is reversed. If, as Applicants do in block 10d in FIG. 9, one inverts the gain of K in FIG. 11A, which is accomplished by multiplication by ($-1$), then one cancels the negative sign of E(s): $(-1) \times (-1) = +1$.

One important feature of this cancellation can be understood when compared with another possible approach, namely, that of inverting the other error signal in FIG. 11, namely, BER, which is the pitch error signal. Such inversion is not desirable, because it causes the control loop to become unstable, as will now be shown.

The pitch loop is that contained within dashed block 166A in FIG. 11. The ratio B/BD (ie, the gain) is given by the expression $]K_{BG}/s]/[1+K_{BG}K_{BF}/s]$, which equals $K_{BG}/[s+K_{BG}K_{BF}]$. If $K_{BG}$ is negated (which effectively negates BER, as suggested above), while keeping everything else in the expression the same, the pitch loop becomes unstable, meaning that pitch will not maintain a steady value. The fact of instability is indicated by the existence of a positive pole. (A pole is a value of s which sets the denominator, $s+K_{BG}K_{BF}$, equal to zero. With $K_{BG}$ negative, the pole is clearly positive, indicating by classical stability criteria that the loop is unstable.) Therefore, inverting pitch error, BER, is not a feasible approach to using pitch to control propeller speed in reverse thrust.

The inventors point out that multiplication by negative one at any point between points 171A and 172A in FIG. 11A serves to cancel the inversion of E(s). Further, the multiplication need not take the form of an inversion of XNER in FIG. 9: It should be understood that inversion of XNER is only one way of cancelling the inversion of (s).

The preceding discussion has described the decision-making steps which create a throttle detent (set in block 8A) when the transition flag (SWXRSA) has a value of +1, indicating a transition from forward to reverse thrust has recently been demanded. On the other hand, if the transition flag has a value of −1, balloon 8 in FIG. 9 is bypassed and the decision path goes to balloon 11. If a recent demand for a reverse-to-forward transition has occurred (i.e., SWXRSA −1), the decision path reaches block 11A, wherein actual throttle valve position (RSA) is set to the reverse idle position (REVIDL).

With the exception that now thrust is changing from reverse to forward, the discussions above regarding block 8A, balloon 9, block 9A, balloon 10 and block 10A apply, respectively, to blocks 11A, balloon 12, block 12A, balloon 13, and block 13A.

After throttle valve (RSA) is set in either block 10A or 13A, block 10E releases the pitch limit set in either block 9b or 12b. With the pitch limit released, speed governing of the propeller by changing pitch is resumed by the speed control.

Circle C (at the bottom of FIG. 8) and D (FIG. 9) join at block 13d in FIG. 10. Block 13d indicates that a variable HMUPLA (not yet discussed) is scheduled as a function of RSA. This means that, for each value of RSA, such as value rsal, a specific value of HMUPLA is scheduled, value hmuplal, in this case. HMUPLA is a signal that controls the rate of fuel delivery to the engine, in pounds per hour, by controlling the position of the throttle valve 127 in FIG. 4. That is, HMUPLA is a throttle valve position signal. However, previously in this discussion, RSA has been referred to as throttle valve position. This apparent inconsistency is resolved as follows.

The preceding discussion has been made in the context of a digital electronic control which produces as an output (eg, on line 126 in FIG. 4) a multi-bit, digital signal. However, in one type of engine in which the present invention has been used, throttle valve 127 in FIG. 4 was part of a hydro-mechanical gas turbine engine control system, known in the art, and not readily connectable to a digital-signal bus. Accordingly, block 13d represents a conversion from the digital signal RSA, which is the throttle valve position determined by, for example, block 11A in FIG. 9, into the variable HMUPLA. The conversion taking place in block 13d in FIG. 10 would be known to one skilled in the art, as it converts an electrical digital signal, RSA, to a signal HMUPLA, which can be used by apparatus, known in the art, to cause a prior art hydromechanical fuel control to deliver fuel at the rate dictated by RSA.

In addition, HMUPLA represents the position of the throttle valve of the gas generator, which provides the airstream 118 in FIG. 5. The gas generator is a rotating turbomachine which rotates in only one direction and whose speed is controlled by the throttle valve. There is no sense of speed reversal associated with either the gas generator or its throttle valve, as there is with the propeller 104 in FIG. 1. However, RSA is a variable, used in the present invention, which does have a sense of forward and reverse. RSA must be converted to HMUPLA if RSA is to control the gas generator.

Following the scheduling of HMUPLA, block 14A updates the value of RSAP by setting it equal to the present throttle valve setting, RSA.

Several important aspects of the invention are the following.

1. The invention can be used in connection with a speed governing control for a propeller. One type of control is that described in U.S. patent application entitled Aircraft Propeller Control, Ser. No. 096,283, filed Sept. 14, 1987, by Stanley G. Day. This application is hereby incorporated by reference. In a speed-governing control, a given propeller speed is demanded and a pitch control mechanism adjusts blade pitch so that the blade aerodynamic loading is sufficient to maintain the demanded speed. Further, in the present invention, with the exception of the pitch limits imposed by blocks 9b and 12b in FIG. 7 (which are released by block 10e), speed governing continues to operate in the invention in both forward and reverse thrust.

2. While the discussion above has been made in the context of a counterrotating propeller pair shown in FIG. 5 which is directly driven by counterrotating turbines, the invention is not limited to use with such propellers. The invention can be used with conventional single-rotation turbo props, and with gear-driven counterrotating propeller systems. In a gear driven system, each propeller is not directly driven by a turbine as shown in FIG. 5, but by one or more, possible counterrotating, high-speed turbines which have speed reduced by a gear box in order to provide a correct shaft speed for the propellers.

3. The position of the throttle lever 120 in FIG. 4 can be forward, reverse, and at points in-between. However, the position of the throttle valve 127 can be closed, fully open, and at points in-between. There is no sense of forward or reverse in the throttle valve. One reason is that the sense of forward and reverse associated with the throttle lever provides necessary information for coordination of the fuel control 123 in FIG. 4 (which controls the throttle valve) with (1) pitch control and (2) control strategies used during reversal of thrust.

4. In the section entitled "Deciding Whether Detent May be Required," the need for throttle detent was deduced based on gas generator speed, XN. However, the inventors point out that XN indicates the level of power output of the gas generator, and that other parameters so indicating can be substituted. For example, the gas generator pressure ratio, which is the ratio of the total pressure of gas stream 118 in FIG. 5 to gas generator inlet pressure, can be used as such a parameter.

Further, propeller speed, when pitch is known, indicates the thrust being produced. Thrust is indicative of gas generator power, and can also be used.

5. The term "throttle valve" has been used in the discussion above. However, it should be understood that control of fuel flow can be attained by means other than a throttling valve.

6. FIG. 9 illustrates logic which implements throttle detention and pitch limits during thrust transitions. Example 6, discussed below, describes this logic in greater detail. FIG. 9 indicates that similar throttle detention occurs during forward-to-reverse transitions, as occurs in reverse-to-forward transitions. (The logic paths following the YES paths from balloons 8 and 11 are very similar.)

However, the inventors have found that it is sometimes preferable to eliminate detention and pitch limits during reverse-to-forward transitions, ie, when the logic takes the YES path from balloon One situation wherein this elimination can be desirable occurs in the testing of a newly designed aircraft engine. During take-off, when the YES path following balloon 11 can sometimes be taken, it can be undesirable to have the throttle detained at an unwanted value, at a time when full thrust is demanded. Pitch limits can be similarly unwanted at take-off. Therefore, in one form of the invention, balloon 11 is eliminated, so that the NO path from balloon 8 leads directly to circle D, at the bottom of FIG. 9.

Figure 9A:
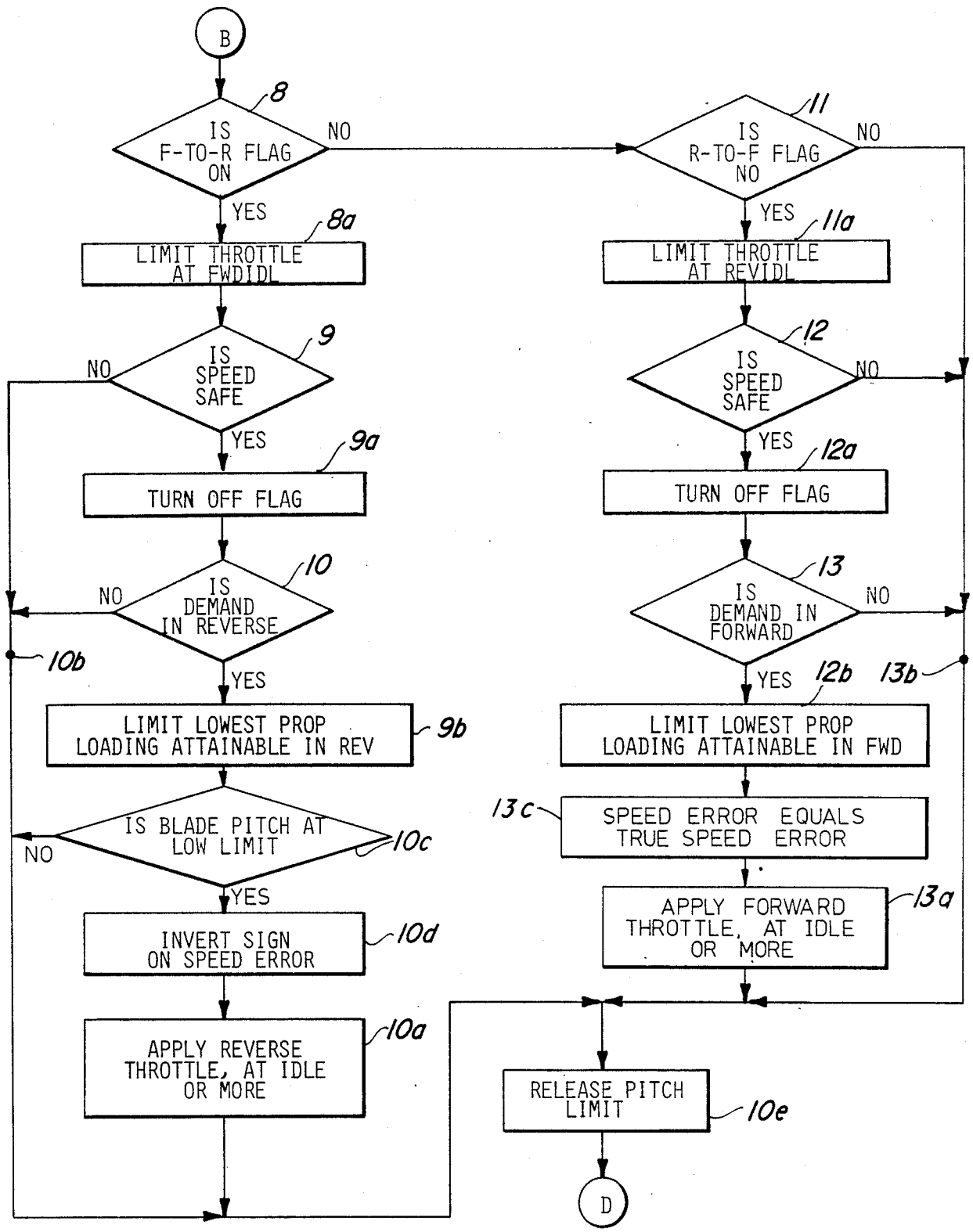

7. Block 13e in FIGS. 9 and 9A serves to assure that speed error, XNER in FIG. 11, is not negated when the propellers are in forward thrust.

8. Throttle detention is not achieved by a physical blockage built into either the throttle lever or the throttle valve, but is a limit imposed upon the value which the variable RSA may attain. RSA controls the throttle valve position.

A few examples of operation of the invention will now be given with reference to the flow charts contained in FIGS. 7–10 and 7A–10A. The examples will include the following: (1) Operation of the invention during high-altitude cruise conditions. (2) Operation of the invention during a cutback in throttle, as occurs during a descent. (3) Operation when the pilot calls for reverse thrust, as just after a landing touchdown. (4) Operation when the pilot shifts out of reverse thrust after landing, and requests a small forward thrust for taxiing. (5) Operation during takeoff. (6) Operation of part of the invention during an aborted take-off.

Figure 7A:
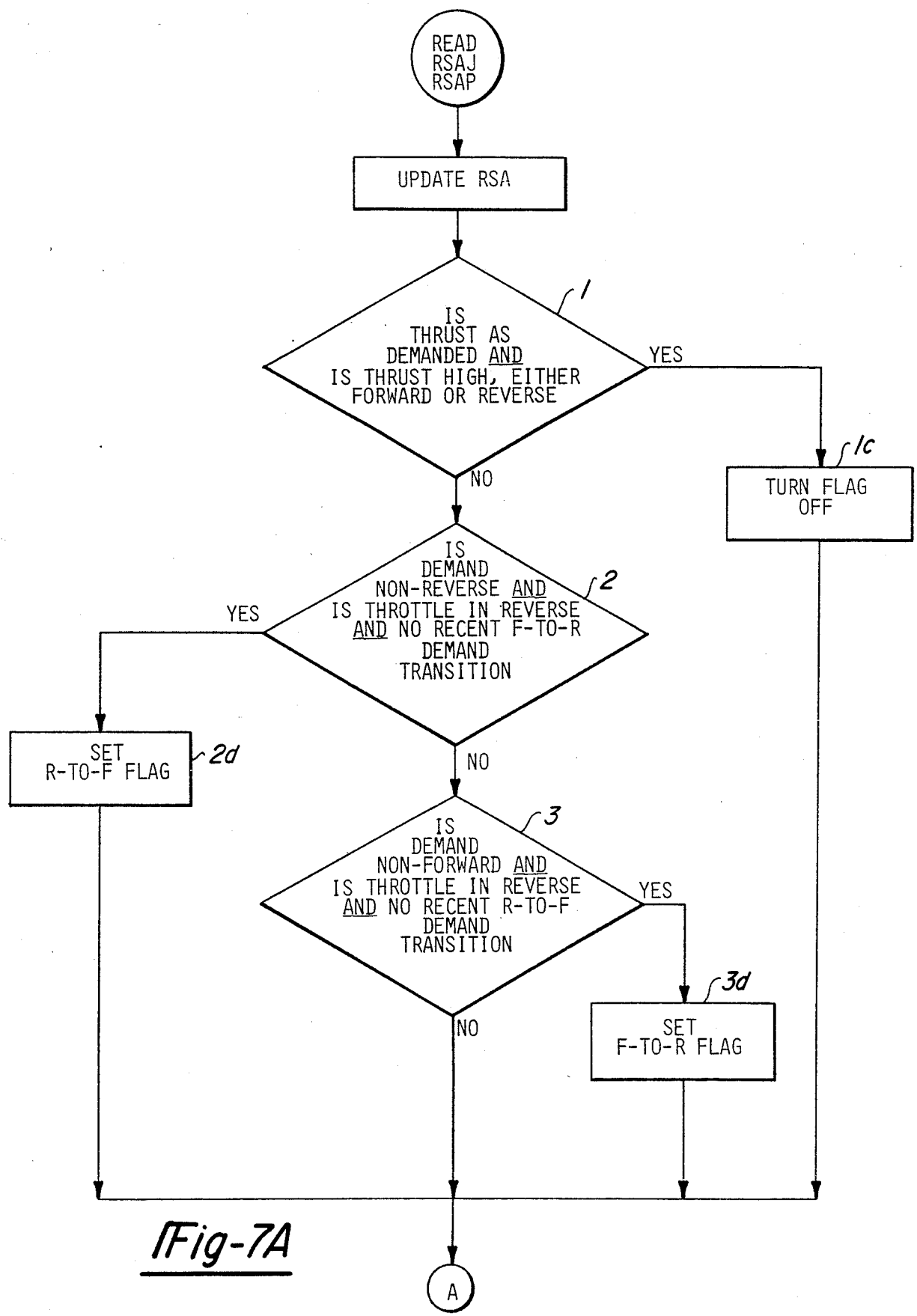
Figure 8A:
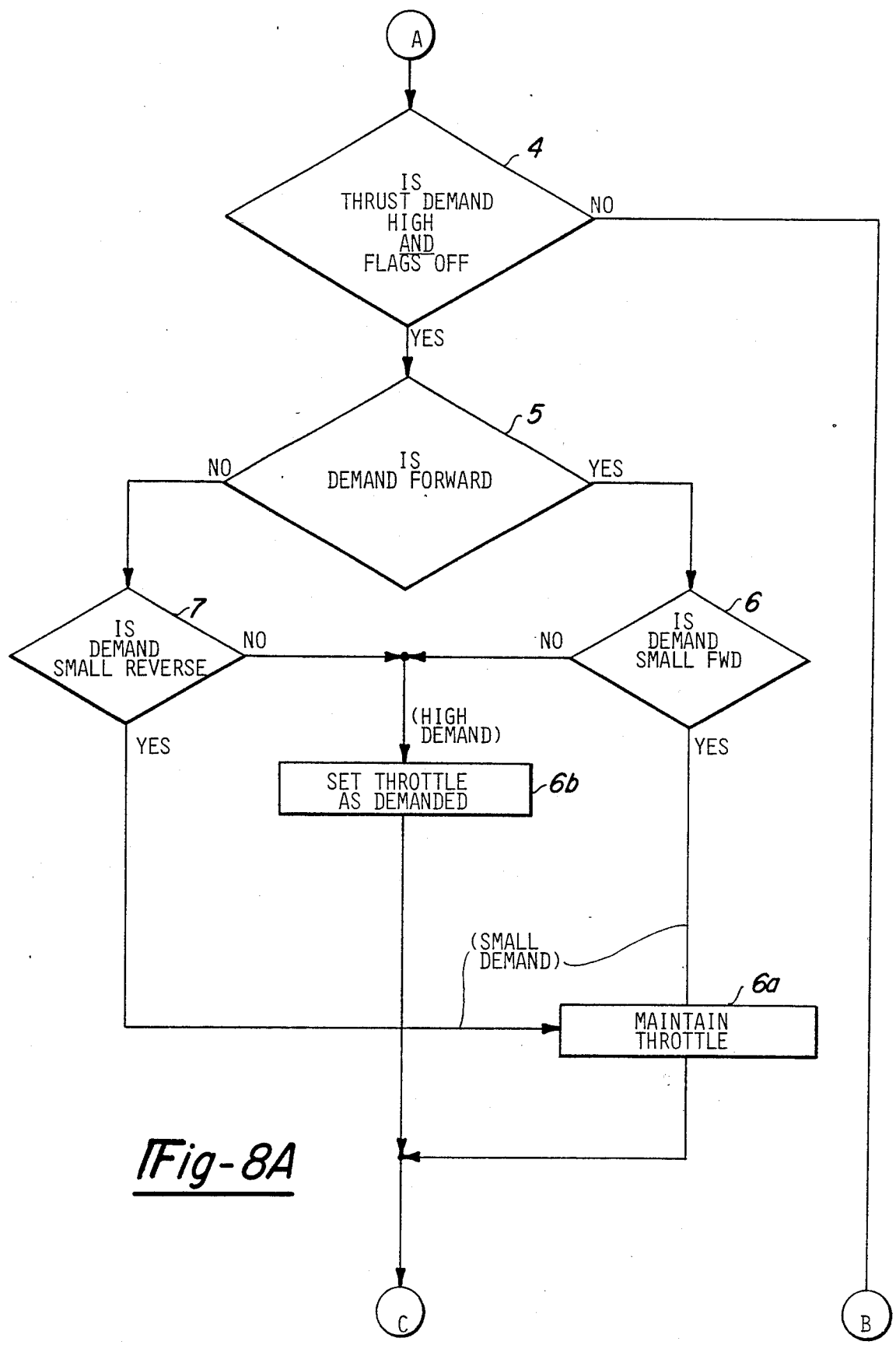

In example (1), during cruise, the YES path is taken from balloon 1 in FIG. 7A. Block IC turns off the thrust transition flag, SWXRSA. From balloon 4 in FIG. 8A, the YES path is taken, leading to balloon 6, from which the NO path leads to block 6b which sets throttle valve 127 in FIG. 4 as demanded by the throttle lever 120. From block 6b, circle C in FIG. 10 is reached, because no flags are set. The logic path then takes an excursion through FIG. 10A, and recycles as indicated by RETURN block 15. Therefore, as shown by this example, the invention has no significant effect during cruise, apart from updating previous throttle position at block 14A in FIG. 10A.

In example (2), during a reduction in throttle valve demand (for example, a reduction from maximum forward thrust in FIG. 4 to a position slightly above forward idle thrust) the NO path is taken from balloon 1 in FIG. 7A because thrust is not as demanded. From balloon 2, the NO path is taken because throttle valve is not in reverse. From balloon 3, the NO path is taken because the demand is not non-forward. At this point, as a result of balloons 2 and 3, no thrust transition flag is set, and the thrust transition flag maintains its default value of 0. (The 0 value is initialized upon start-up of the system.) From balloon 4, in FIG. 8, the YES path is taken to balloon 5, and then the logic path leads to block 6b. The YES path is taken from balloon 4 because demanded throttle (RSAJ) exceeds the forward idle position (FWDIDL). In block 6b, throttle valve 127 in FIG. 4 is set as demanded by the throttle lever 120. Then, circle C in FIG. 8 is reached, followed by block 15, which cycles the logic path through FIG. 7.

In example (3), after landing, when the pilot drives the throttle lever 120 in FIG. 4 from a position near forward idle to maximum reverse thrust, the NO path is taken from balloon 1 because thrust is not as demanded. From balloon 2, the NO path is taken because demand is for reverse thrust, which is not non-reverse. However, at balloon 3, the YES path is taken because all conditions are fulfilled. Accordingly, the forward-to-reverse thrust transition flag is set (i.e., SWXRSA is set to +1.) From balloon 4, the NO path is taken because the flags are not off: the forward-to-reverse thrust transition flag is set.

From balloon 8, the YES path is taken, leading to the throttle detent. Block 8a limits the throttle valve (that is, fuel delivery to the engine is restricted). Balloon 9 measures whether the engine speed is below a limit, indicating that speed is safe enough that the throttle limit of block 8a can be terminated. If speed is not safe, the NO path from balloon 9 is taken, followed by an excursion through the paths on FIG. 10A and then a return to balloon 1. From balloon 1, the path returns to balloon 9 in FIG. 9A. This cycling continues until engine speed falls below the limit XNL. At this time, the YES path is taken from balloon 9, which turns off the thrust transition flag at block 9A. Then, balloon 10 inquires whether the throttle lever 120 in FIG. 4 has passed the neutral idle position into a reverse position. If so, the YES path is taken, leading to block 9b, wherein a pitch limit is imposed upon the propeller and the throttle valve 127 in FIG. 4 is set to reverse idle (REVIDL). The phrase "set min load limit on rev pitch" in block 9b is an abbreviation for the phrase "place a limit on the pitch such that, when pitch is in reverse, and at the limit, a minimal acceptable load is upon the propeller." The minimal load prevents overspeed.

The minimum propeller loading imposed by block 9b remains in existence until released by block 10e. However, block 10e is reached very soon after the limit is attained: the length of time needed for the logic path to travel from balloon 10c to block 10e is determined by the speed of the computer making the computations. The attainment of the limit is ascertained by balloon 10c.

A significant effect of the invention under these conditions is the delay imposed by the cycling associated with balloon 9. That is, for example, until engine speed is below the limit XNL, the NO path from balloon 9 is taken, and block 9A is not reached. The flag remains set until engine speed falls below the limit XNL.

In addition, balloon 10 prevents block 10A from operating in the event that the pilot aborts the transition into reverse thrust after having reduced thrust from maximum forward to forward idle. In such a case, the NO path is taken from balloon 10, followed by cycling which returns to balloon 10. However, the NO paths are taken from balloons 8 and 11, so that, at this time, the cycling is similar to that described in connection with the first example.

In example (4), covering a shift from reverse thrust into forward idle as during taxiing following landing, the NO path is taken from balloon 1. The YES path is taken from balloon 2, because all conditions are fulfilled. Block 2d sets the thrust transition flag at −1 because a reverse-to-forward transition has occurred. At balloon 4, the NO path is taken because demand is neither high nor are flags off. The NO path is taken from balloon 8, because the reverse-to-forward flag is on, causing the YES path from balloon 11 to be taken. As in the third example, the throttle detent becomes active with throttle valve set to reverse idle power (REVIDL) in block 11a. It is noted that "reverse idle" throttle valve position is now the throttle limit, even though the demanded throttle is "forward idle": the throttle detent is active. At balloon 12, a cycling along the NO path is taken until engine speed falls below the safe limit. At that time, the YES path is taken, causing the thrust transition flag to terminate in block 12a. The YES path is taken from balloon 13, thus allowing the throttle valve to provide the thrust demanded, as allowed by block 13a. A significant feature of the invention in this example is the throttle detention described in FIG. 9A, which occurs until engine speed is below the limit XNL.

In example (5), at takeoff, demanded thrust is driven from forward idle to maximum forward thrust. Accordingly, the NO path is taken from balloon 1. The NO path is taken from balloons 2 and 3. The YES path is taken from balloon 4, leading to balloon 5. The YES path is taken from balloon 5, followed by the NO path from balloon 6, leading to block 6b which sets the throttle valve as demanded. The logic path then takes an excursion through FIG. 10A, as discussed above, and returns to balloon 1. One significant feature of this example is that no thrust transition flags are set, and no throttle detention occurs.

In example (6), concerning an aborted take-off, FIG. 13 illustrates the functioning of the throttle detent and pitch limits. FIG. 13 is divided into three regions: top, central, and bottom. When a transition from forward to reverse thrust is demanded (near point 233 in the bottom region), when the pilot wishes to slow the aircraft after the aborted take-off roll, throttle valve position, RSA, follows (subject to such factors as control law dynamics in the fuel control system) throttle level position RSAJ until point 223 is reached. At that time, throttle lever position, RSAJ, falls below forward idle, FWDIDL, and balloon 3 in FIG. 7 caused block 3d to set the thrust transition flag, SWXRSA to 1.

Such a value of SWXRSA causes the logic to follow the YES path from balloon 8 to block 8a in FIG. 9. Accordingly, block 8a sets RSA to FWDIDL, thereby keeping RSA at the level of point 223 at the bottom of FIG. 13. RSA is kept on the line between points 223 and 227. This setting of RSA persists until the engine power parameter, XN in this example, falls below XNL, which occurs at point 205 at the top of FIG. 13.

At this time, balloon 9 in FIG. 9 causes the logic to reach balloon 10. Balloon 10 inquires whether RSAJ in FIG. 13 is below RSAMID. In FIG. 13, RSAJ crosses RSAMID at point 235.

(It should be noted that, in most cases, RSAJ will drop to a low value before XN, engine power level, drops to a low value, because RSAJ controls XN. However, in FIG. 9, balloon 10 is reached only after balloon 9 indicates that XN is below the limit XNL. This explains why point 205 at the top of FIG. 13 is later in time than point 235, at the bottom. Restated, the answer to balloon 10 in FIG. 9 will probably be YES before the answer to balloon 9 will be YES, even though the logic reaches balloon 9 first.

This sequence of inquiry acts as a redundant safety feature because the logic in FIG. 8 makes a similar inquiry: assuming that the transition flag, SWXRSA, is set at either plus or minus one, then the inquiry on lines 4A and 4B control the logic path. If demanded thrust is high (eg, RSAJ>FWDIDL as in line 4B) then the YES path is taken from balloon 4. If demanded thrust is lower (eg, RSAJ<FWDIDL as in balloon 4), then the NO path is taken from balloon 4. Therefore, circle B in FIG. 9 is reached when a low thrust is demanded, and the YES path is taken from balloon 8 when SWXRSA equals 1, indicating a probable transition in thrust, which will be accompanied by drop in demand, and thus a drop in engine power.)

The YES path from balloon 10 leads to block 9b, which sets the reverse pitch limit 210 in the middle plot of FIG. 13. Setting this limit has the effect of instructing the pitch control system to drive pitch to point 208, in the central plot, as fast as possible. Further, block 9b sets RSA to REVIDL, thus moving from point 227 to point 229.

When the blade reaches the limit, 210, balloon 10c in FIG. 9 allows the sign on speed error, XNER, to, be inverted in block 10d, as discussed above in connection with FIGS. 11 and 11A. Then block 10a causes throttle valve position, RSA, to move from point 238, at the bottom of FIG. 13, to point 237.

In this example, when blade pitch reaches the pitch limit at point 208 in FIG. 13, central plot, the inversion of the speed error sign, which occurs in block 10d in FIG. 9, and the release of the pitch limit allows speed governing of the propeller to occur in reverse thrust. This is indicated by the change in slope at point 208 in FIG. 13. After the release of the pitch limit, speed governing causes pitch to follow a path such as the path between points 208 and 215.

However, in practice, the path will probably continue along an extension of the line from point 107 to point 208, namely, along the line from point 208 to point 213. One reason is that, at this time in operation, a large error in pitch will exist (ie, actual pitch will greatly deviate from demanded pitch, because demanded thrust is at MAX REV, at point 237 at the bottom of FIG. 13, while actual pitch has been limited at the limit 210 in the central plot). Consequently, upon release of the limit at point 208, the pitch control mechanism will drive pitch to a large reverse pitch as fast as possible. Since, generally, the previous pitch change from point 107 to point 208 was also made as fast as possible, partly to reduce the dwell time in the region of small pitch angles, the pitch change beyond point 208 will probably be an extension of the line between points 107 and 208. After pitch reaches the approximately correct value, near point 215, speed control using pitch change becomes operational in reverse thrust. Numerous substitutions and modifications can be undertaken without departing from the true spirit and scope of the invention as defined in the following claims:

We claim:

1. A system for controlling an aircraft propeller driven by an engine, comprising:
   a. means for detecting a reverse signal demanding a reversal in thrust and
   b. means for placing a limit on fuel flow to the engine in response to the reverse signal.

2. A system according to claim 1 and further comprising:
   c. means for removing the limit on fuel flow when the speed of a selected rotating component falls below a threshold.

3. A system for controlling an aircraft propeller comprising:
   a. means for measuring propeller pitch; and
   b. means for controlling pitch when the propeller is providing forward thrust and when providing reverse thrust.

4. A control for an aircraft propeller comprising:
   a. means for sensing the onset of a reversal in thrust produced by the propeller and
   b. means for limiting rotational speed of the propeller during reversal.

5. A control for an aircraft propeller comprising:
   a. means for sensing the onset of a reversal in thrust produced by the propeller; and
   b. means for restraining propeller pitch above a threshold until power delivered to the propeller falls below a limit.

6. A control for an aircraft propeller comprising:
   a. means for sensing a request for a reversal in propeller thrust;
   b. means for limiting the fuel delivered to the engine in response to the request; and
   c. means for terminating the limit on fuel flow when a parameter indicative of thrust falls below a threshold.

7. A control in accordance with claim 6 in which the parameter indicates rotational speed of the propeller.

8. A control in accordance with claim 6 in which the parameter indicates power delivered to the propeller.

9. A control for an aircraft propeller comprising:
   a. means for sensing the rotational speed of the propeller;
   b. limit means for limiting the rotational speed during a transition from forward thrust to reverse thrust; and
   c. means for activating and deactivating the limit means upon the occurrence of predetermined events.

10. A control for an aircraft propeller which can provide reverse thrust, comprising:
    a. means for placing a limit on rate of fuel flow to the engine during thrust transition;
    b. means for detecting the end of thrust transition; and
    c. means for changing the limit after the thrust transition ends.

11. A control for an aircraft propeller which can undergo thrust transitions from forward to reverse, and from reverse to forward, comprising:
    a. sensing means for sensing the occurrence of a transition and
    b. limit means for limiting rotational speed of the propeller during the transition.

12. In an aircraft propulsion system which (1) includes a speed-governing control which maintains the rotational speed of the propeller at a desired value by adjustment of propeller pitch and (2) can undergo thrust transitions from forward to reverse, and from reverse to forward, the improvement comprising:
    a. sensing means for sensing the occurrence of a transition;
    b. limit means for limiting rotational speed of the propeller during the transition; and
    c. pitch limit means for limiting the propeller pitch which the speed governing control can force the propeller to attain during the transition.

13. A control according to claim 12 and further comprising:
    d. inversion means for indicating to the speed-governing control that a change in the algebraic sign of the propeller's load-pitch function has occurred.

14. In an aircraft propulsion system having a propeller (1) which provides forward thrust when the propeller blades have a pitch angle exceeding a reference angle and (2) which provides reverse thrust when the pitch angle is below the reference angle, the improvement comprising:
    a. sensing means for sensing a demand for reverse thrust;
    b. speed control means for controlling propeller speed during reverse thrust by adjusting pitch; and
    c. means for indicating to the speed control means that the pitch angle is below the reference angle.

15. In a system which controls aircraft propeller speed by adjusting pitch in response to a speed error signal, the improvement comprising:
    a. sensing means for sensing the delivery of reverse thrust by the propeller; and
    b. means for modifying the algebraic sign of the speed error signal during reverse thrust.

16. In an aircraft propeller system in which forward and reverse pitch positions are attainable, a control system comprising:

a. speed control means for reducing and increasing propeller speed by, respectively, increasing and decreasing forward pitch;
b. transition means for detecting a transition from forward to reverse thrust; and
c. inversion means for causing the speed control means to reduce and increase propeller speed during reverse thrust by, respectively, increasing and decreasing reverse pitch.

17. A method of controlling an aircraft propeller during thrust reversal, comprising the following steps:
   a. placing a limit on fuel flow in response to a request by the pilot for thrust reversal; and
   removing the limit when, according to a predetermined criterion, overspeed by the propeller is not probable.

18. A method of controlling an aircraft propeller during thrust reversal, comprising the following steps:
   a. ascertaining whether a pilot has requested a reversal in thrust, and, if so, limiting propeller speed by both limiting fuel flow and limiting propeller pitch until rotational speed of the propeller falls below a threshold; and
   b. removing said limits on fuel flow and propeller pitch when said rotational speed falls below the threshold.

19. A method of controlling an aircraft propulsion system which includes an engine which drives a propeller, comprising the following steps:
   a. ascertaining the occurrence of a transition in thrust from forward to reverse and setting a flag accordingly;
   b. ascertaining the status of the flag and, if set, then
      i) limiting fuel flow to the engine to a predetermined rate until engine power falls below a predetermined threshold; and
   c. if the flag is not set, then
      ii) if the fuel flow demanded exceeds a predetermined amount, providing the demanded fuelflow to the engine. and
      iii) if the fuel flow demanded does not exceed the predetermined amount, providing a non-demanded fuel flow to the engine.

20. In a method of controlling an aircraft propeller (1) which can undergo thrust transitions from forward to reverse and (2) which controls rotational speed of the propeller by adjusting pitch, the improvement comprising:
   a. the step of governing propeller speeding reverse thrust by adjusting pitch.

21. In a method of controlling an aircraft propeller (1) which can undergo thrust transitions from forward to reverse and from reverse to forward and (2) which includes a speed governing control system, the improvement comprising:
   a. the step of governing speed using the speed governing control during reverse thrust.

22. A method of controlling an aircraft propeller, comprising the following steps:

a. ascertaining the logic status of the following first logic proposition (Lp-1):
(is the difference between actual throttle position and demanded throttle position less than a predetermined value) AND (is actual throttle position equal to or greater than a predetermined forward idle position OR is actual throttle position equal to or less than a predetermined reverse idle
b. if LP-1 is true, then setting a detent flag to a first value indicating that a thrust transition is not occurring;
c. if LP-1 is FALSE, then ascertaining the logic status of the following second logic proposition, LP-2:
(is the demanded throttle position greater than a predetermined reverse idle position) and (is the actual throttle position less than a predetermined neutral idle position) and (does the detent flag indicate that a transition from forward thrust to reverse thrust is absent);
d. if LP-2 is FALSE, then ascertaining the logic status of the following third logic proposition, LP-3:
(is the demanded throttle position less than a predetermined forward idle position) and
(is the actual throttle position greater than a predetermined neutral idle position) and
(does the detent flag indicate that a transition from reverse thrust to forward thrust is not occurring);
e. if LP-2 is true, then setting the detent flag to a second value indicating that a thrust transition from reverse to forward is being demanded;
f. if LP-3 is TRUE, then setting the detent flag to a third position indicating that a thrust transition from forward to reverse is being demanded;
g. if LP-3 is FALSE, leaving the status of the detent flag unchanged;
h. ascertained the logic status of the following fourth logic proposition, LP-4;
(is the demanded throttle position equal to or less than the predetermined reverse idle position OR is the demanded throttle position equal to or greater than the predetermined forward idle position) and
(is the detent flag at the first position, indicating that a thrust transition is not requested);
i. if LP-4 is TRUE, then ascertaining the logic status of the following fifth logic proposition, LP-5:
(is thrust demanded greater than idle, either forward or reverse);
j. if LP-4 is FALSE, then, for either forward or reverse thrust, setting throttle position to one or two predetermined throttle limits until a parameter indicative of thrust available falls below a predetermined threshold, and then removing the throttle limit;
k. if LP-5 is TRUE, then setting throttle at demanded throttle position; and
l. if LP-5 is FALSE, then maintaining throttle at its current position.

\* \* \* \* \*